(12) United States Patent
Tsai

(10) Patent No.: US 10,795,249 B2
(45) Date of Patent: Oct. 6, 2020

(54) PROJECTOR AND ILLUMINATION SYSTEM

(71) Applicant: Coretronic Corporation, Hsin-Chu (TW)

(72) Inventor: Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/006,788

(22) Filed: Jun. 12, 2018

(65) Prior Publication Data
US 2018/0373131 A1    Dec. 27, 2018

(30) Foreign Application Priority Data
Jun. 23, 2017   (CN) .......................... 2017 1 0487617

(51) Int. Cl.
| | | |
|---|---|---|
| *G03B 21/20* | (2006.01) | |
| *H04N 9/31* | (2006.01) | |
| *G02B 26/08* | (2006.01) | |
| *G02B 26/10* | (2006.01) | |

(52) U.S. Cl.
CPC ....... *G03B 21/204* (2013.01); *G02B 26/0833* (2013.01); *G02B 26/10* (2013.01); *G03B 21/2066* (2013.01); *H04N 9/3129* (2013.01); *H04N 9/3158* (2013.01)

(58) Field of Classification Search
CPC .............. G03B 21/204; G03B 21/2033; H04N 9/3129; H04N 9/3158; H04N 9/3161
See application file for complete search history.

(56) References Cited

U.S. PATENT DOCUMENTS

| | | | | |
|---|---|---|---|---|
| 2009/0174632 A1 | 7/2009 | Hajjar et al. | | |
| 2012/0019788 A1* | 1/2012 | Katou | ................ | G02B 26/0833 353/33 |
| 2015/0043047 A1* | 2/2015 | Chikaoka | ............. | G02B 26/101 359/199.3 |
| 2015/0286120 A1* | 10/2015 | Ohno | ................... | G02B 26/101 353/84 |

FOREIGN PATENT DOCUMENTS

| | | |
|---|---|---|
| CN | 101836160 B | 2/2012 |
| CN | 102449550 A | 5/2012 |
| CN | 104145204 A | 11/2014 |
| CN | 105022214 A | 11/2015 |

* cited by examiner

*Primary Examiner* — Ryan D Howard

(57) ABSTRACT

A projector includes an illumination system, a light valve, and a lens. The illumination system includes a scanning light source assembly and a wavelength conversion device. The scanning light source assembly provides an excitation beam. The excitation beam scans in a plurality of scanning directions. The wavelength conversion device is disposed on a transmission path of the excitation beam. The excitation beam scans the wavelength conversion device in the scanning directions in a plurality of time intervals respectively, and the excitation beam is converted into a color beam by the wavelength conversion device in one of the time intervals. The light valve is disposed on a transmission path of an illumination beam and converts the illumination beam into an image beam, wherein the illumination beam includes the color beam. The lens is disposed on a transmission path of the image beam.

23 Claims, 9 Drawing Sheets

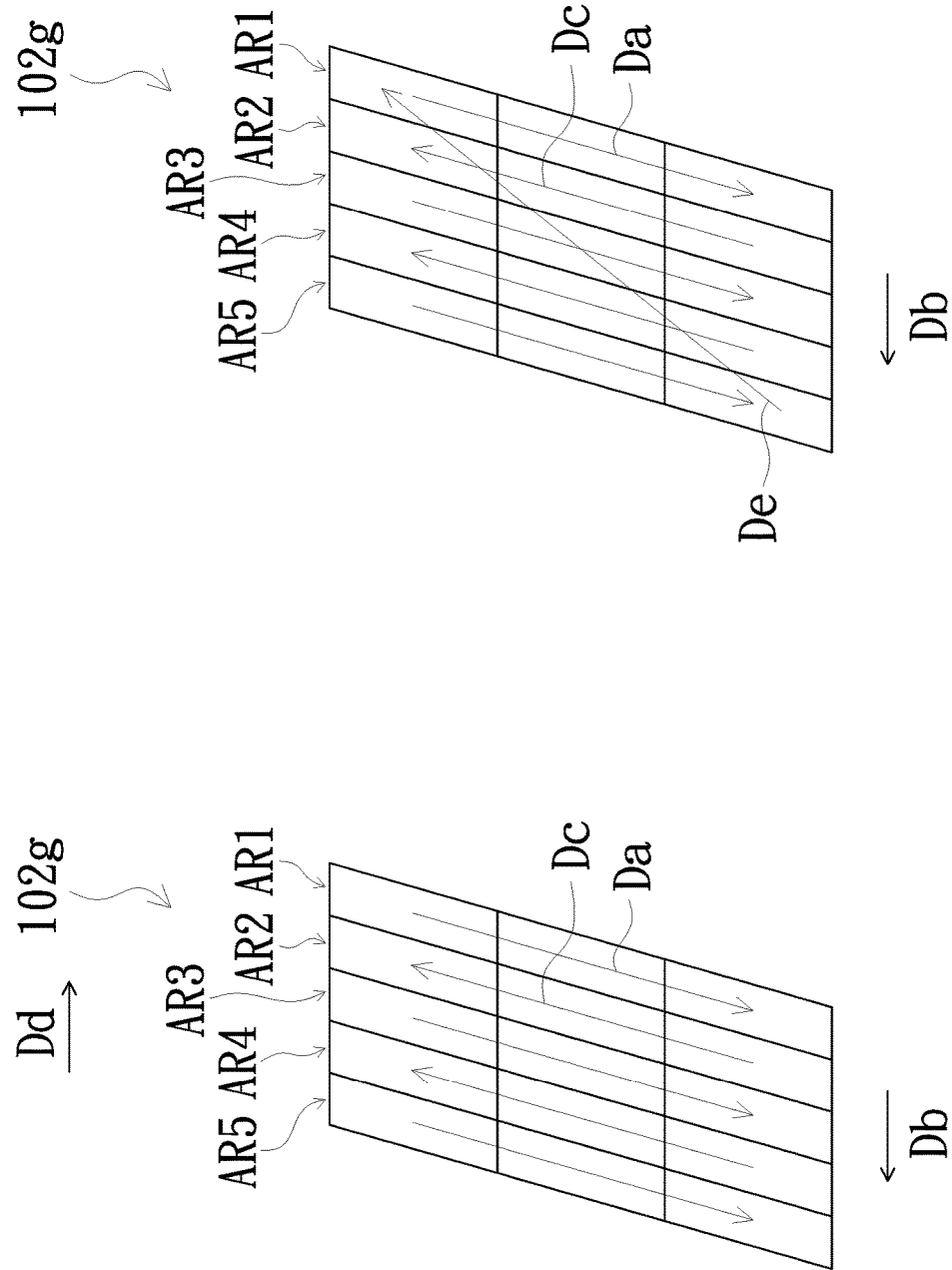

PROJECTOR AND ILLUMINATION SYSTEM

CROSS-REFERENCE TO RELATED APPLICATION

THIS APPLICATION CLAIMS THE PRIORITY BENEFIT OF CHINA APPLICATION (CN201710487617.4 FILED ON 2017 Jun. 23). THE ENTIRETY OF THE ABOVE-MENTIONED PATENT APPLICATION IS HEREBY INCORPORATED BY REFERENCE HEREIN AND MADE A PART OF THIS SPECIFICATION.

FIELD OF THE INVENTION

The invention relates to an illumination system, and more particularly to an illumination system for a projector.

BACKGROUND OF THE INVENTION

The current projector architecture mainly includes an illumination system, a light valve and a projection lens. The illumination system is used to provide an illumination beam, the light valve is used to convert the illumination beam into an image beam, and the projection lens is used to project the image beam onto a screen, thereby forming an image screen on the screen. The illumination system produces illumination beams of different colors and mainly uses a fixed excitation light source to emit an excitation beam to excite wavelength conversion materials, so that the required light source of pure color is generated. The current wavelength conversion material adopts the phosphor wheel architecture, that is, a plurality of phosphors of different colors is coated on a wheel-shaped substrate to form a phosphor wheel. When the phosphor wheel is driven to rotate by the drive motor, the excitation beam sequentially excites the phosphors on the wheel-shaped substrate, thereby causing the phosphor wheel to generate a plurality of corresponding color beams.

However, in order to increase the phosphor coating zone for increasing the wavelength conversion efficiency of the illumination system, the volume of the phosphor wheel is increased. In this case, the volume of the projector increases accordingly. Further, in order to increase the rotational speed of the phosphor wheel for increasing the update frequency of the projection screen, the noise generated by the drive motor driving the phosphor wheel is also increased. Therefore, how to improve the above-mentioned problems is the focus of attention of the person in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a projector having an illumination system with a simple structure and excellent wavelength conversion efficiency.

Another objective of the invention is to provide an illumination system with a simple structure and excellent wavelength conversion efficiency.

Other objects and advantages of the invention will become apparent from the technical features disclosed herein.

In order to achieve one or some or all of the above objectives or other objectives, the invention provides a projector including an illumination system, a light valve, and a lens. The illumination system includes a scanning light source assembly and a wavelength conversion device. The scanning light source assembly is adapted to provide an excitation beam. The excitation beam is adapted to scan in a plurality of scanning directions. The wavelength conversion device is disposed on a transmission path of the excitation beam. The excitation beam scans the wavelength conversion device in the scanning directions in a plurality of time intervals respectively, and the excitation beam is converted into a color beam by the wavelength conversion device in one of the time intervals. The light valve is disposed on a transmission path of an illumination beam, and adapted to convert the illumination beam into an image beam, wherein the illumination beam includes the color beam. The lens is disposed on a transmission path of the image beam.

In order to achieve one or some or all of the above objectives or other objectives, the invention provides an illumination system including a scanning light source assembly and a wavelength conversion device. The scanning light source assembly is adapted to provide an excitation beam. The excitation beam is adapted to scan in a plurality of scanning directions, and the excitation beam does not have image information. The wavelength conversion device is disposed on a transmission path of the excitation beam. The excitation beam scans the wavelength conversion device in the scanning directions in a plurality of time intervals respectively, and the excitation beam is converted into a color beam by the wavelength conversion device in one of the time intervals.

In summary, the illumination system of the projector of the embodiment of the invention includes a scanning light source assembly and a wavelength conversion device. In the embodiment of the invention, the wavelength conversion device is disposed on the transmission path of the excitation beam emitted from the scanning light source assembly. In the embodiment of the invention, the excitation beam is adapted to scan the wavelength conversion device in a plurality of scanning directions in a plurality of time intervals respectively, and the excitation beam is converted into a color beam by the wavelength conversion device in one of the time intervals. In the embodiment of the invention, the excitation beam of the scanning light source assembly is adapted to sequentially scan a plurality of wavelength conversion materials of the wavelength conversion device, thereby causing the wavelength conversion device to generate different color beams. In the structural design of the illumination system of the embodiment of the invention, the structure of the fixed wavelength conversion device and the movable light source/scanning element in the scanning light source module is simple, so that the wavelength conversion materials may have a variety of various arrangements and also have a good wavelength conversion efficiency, ultra-low noise or no noise and other advantages. Thus, the illumination system of the embodiment of the invention is disposed at the projector without increasing the volume of the projector, thereby causing the projector has an advantage of being short and thin.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A is a scanning order diagram of a scanning light source assembly in accordance with an embodiment of the invention;

FIG. 8B is a scanning order diagram of a scanning light source assembly in accordance with another embodiment of the invention;

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
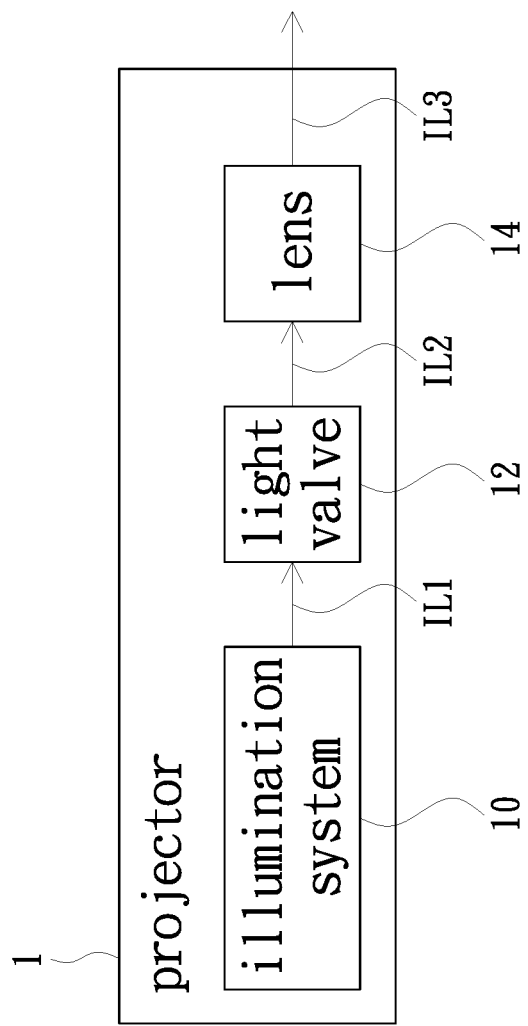
FIG. 1 is a schematic functional block diagram of a projector in accordance with an embodiment of the invention.

FIG. 1 is a schematic functional block diagram of a projector in accordance with an embodiment of the invention. As shown in FIG. 1, the projector 1 of the embodiment includes an illumination system 10, a light valve 12, and a lens 14. In the embodiment, the illumination system 10 is adapted to provide an illumination beam IL1. In the embodiment, the light valve 12 is disposed/located on the transmission path of the illumination beam IL1, and the light valve 12 is adapted to convert the illumination beam IL1 into an image beam IL2, that is, modulate the illumination beam IL1 to the image beam IL2 having/containing image information. In the embodiment, the light valve 12 may be a digital micromirror device (DMD), a liquid crystal on silicon (LCoS) or a liquid crystal display (LCD) panel; however, the invention does not limit the type and number of light valves. The lens 14 is disposed/located on the transmission path of the image beam IL2, the image beam IL2 passes through the lens 14 and becomes a projection beam IL3, and the projection beam IL3 is projected to the outside of the projector 1.

The detailed structure of the illumination system 10 of the embodiment will be further described below.

Figure 2:
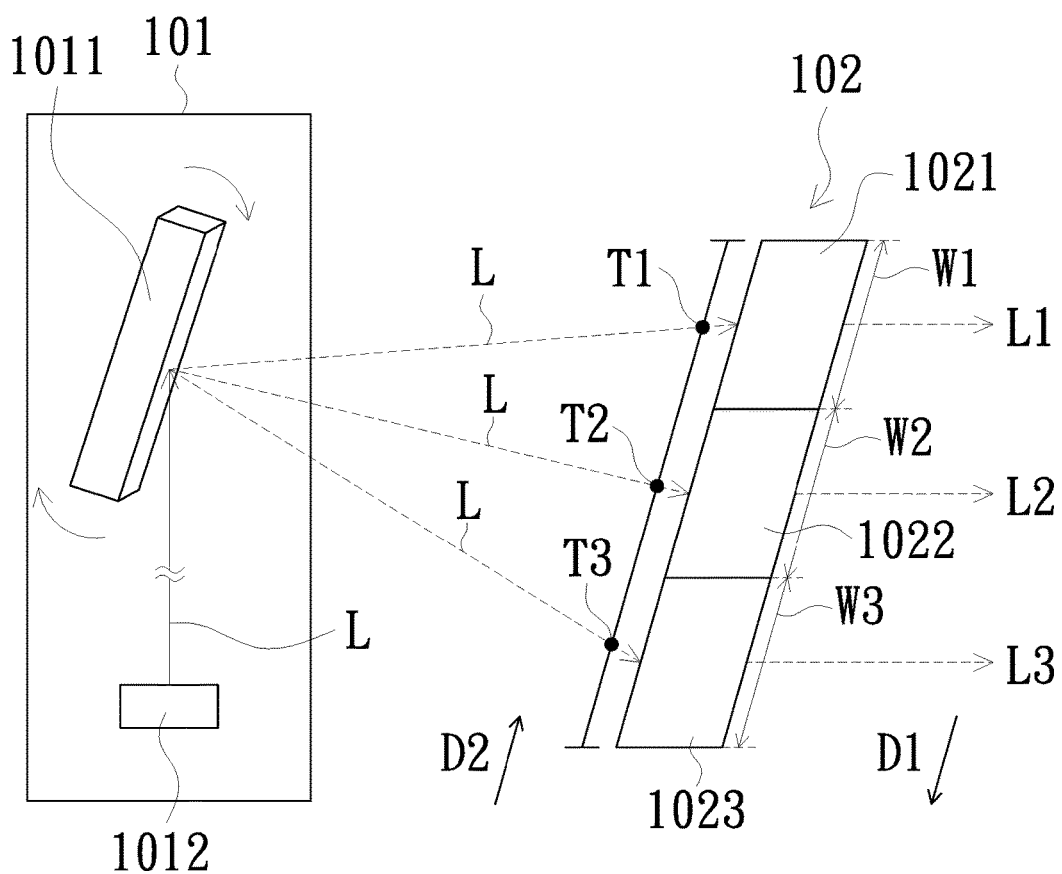
FIG. 2 is a schematic view of the illumination system shown in FIG. 1.

FIG. 2 is a schematic view of the illumination system shown in FIG. 1. As shown in FIGS. 1 and 2, the illumination system 10 of the embodiment includes a scanning light source assembly 101 and a wavelength conversion device 102. The scanning light source assembly 101 is adapted to provide an excitation beam L, and the excitation beam L is adapted to scan in a plurality of scanning directions. The wavelength conversion device 102 is disposed on the transmission path of the excitation beam L. In the embodiment, the wavelength conversion device 102 is fixedly disposed on the transmission path of the excitation beam L provided by the scanning light source assembly 101. In the embodiment, the wavelength conversion device 102 is fixedly disposed in the projector 1, i.e., fixed in the illumination system 10. In addition, the wavelength conversion device 102 includes a plurality of wavelength conversion materials. For example, in the embodiment, the wavelength conversion materials include a first wavelength conversion material 1021, a second wavelength conversion material 1022, and a third wavelength conversion material 1023. In the embodiment, the excitation beam L provided by the scanning light source assembly 101 is adapted to sequentially scan the wavelength conversion materials (e.g., the first wavelength conversion material 1021, the second wavelength conversion material 1022, and the third wavelength conversion material 1023).

Therefore, the excitation beam L is converted into a first color beam L1 by the first wavelength conversion material 1021 at the first time point T1 (or the first time interval), converted into a second color beam L2 by the second wavelength conversion material 1022 at the second time point T2 (or the second time interval), and converted into a third color beam L3 by the third wavelength conversion material 1023 at the third time point T3 (or the third time interval). In the embodiment, the first color beam L1, the second color beam L2, and the third color beam L3 constitute the illumination beam IL1.

In the embodiment, the wavelength conversion device 102 is a reflective wavelength conversion device 102 for example; that is, the first color beam L1, the second color beam L2 or the third color beam L3 generated by the excitation beam L exciting the first wavelength conversion material 1021, the second wavelength conversion material 1022 or the third wavelength conversion material 1023 is reflected by the wavelength conversion device 102, but the invention does not limit the type of the wavelength conversion device. For example, a reflective layer may be disposed on the bottom surface of the first wavelength conversion material 1021, the second wavelength conversion material 1022 or the third wavelength conversion material 1023 to reflect the first color beam L1, the second color beam L2 or the third color beam L3. For example, the reflective wavelength conversion device may employ a reflective substrate, and the first wavelength conversion material 1021, the second wavelength conversion material 1022 or the third wavelength conversion material 1023 may be coated on the reflective substrate. In other embodiments, the wavelength conversion device 102 is a transmissive wavelength conversion device for example; that is, the first color beam L1, the second color beam L2 or the third color beam L3 generated by the excitation beam L exciting the first wavelength conversion material 1021, the second wavelength conversion material 1022 or the third wavelength conversion material 1023 penetrates the wavelength conversion device 102, but the invention is not limited thereto. For example, the transmissive wavelength conversion device may employ a transparent glass or transparent plastic material as a transparent substrate, and the first wavelength conversion material 1021, the second wavelength conversion material 1022 or the third wavelength conversion material 1023 may be coated on the transparent substrate. In addition, the wavelength conversion device 102 of the embodiment including the first wavelength conversion material 1021, the second wavelength conversion material 1022, and the third wavelength conversion material 1023 is one embodiment, and the invention is not limited thereto. The number of wavelength conversion materials included in the wavelength conversion device 102 may be increased or decreased according to the actual requirement, and the generated color beams are not limited to have the same or different colors.

In the embodiment, the excitation beam L provided by the scanning light source assembly 101 is a blue beam for example, but the invention is not limited thereto. In the embodiment, the first wavelength conversion material 1021 of the wavelength conversion device 102 is a yellow phosphor for example, the second wavelength conversion material 1022 is a green phosphor for example, and the third wavelength conversion material 1023 is a red phosphor for example, but the invention is not limited thereto. In the embodiment, the first color beam L1 generated after the first wavelength conversion material 1021 is excited by the excitation beam L at the first time point T1 (or the first time interval) is a yellow beam for example, the second color beam L2 generated after the second wavelength conversion material 1022 is excited by the excitation beam L at the second time point T2 (or the second time interval) is a green beam for example, and the third color beam L3 generated after the third wavelength conversion material 1023 is excited by the excitation beam L at the third time point T3 (or the third time interval) is a red beam for example, but the invention is not limited thereto. In other embodiments, the wavelength conversion device 102 further includes, for example, a wavelength reservation zone (not shown), and the excitation beam L provided by the scanning light source assembly 101 is not converted into a beam of other colors after being incident on the wavelength reservation zone. In other embodiments, the excitation beam L provided by the scanning light source assembly 101 is, for example, still a blue beam after being incident on the wavelength reservation zone.

As shown in FIG. 2, the scanning light source assembly 101 of the embodiment includes a scanning element 1011 and a light source 1012. In the embodiment, the light source 1012 is adapted to emit the excitation beam L. In the embodiment, the light source 1012 is a laser light source for example, but the invention does not limit the type of the light source. In other embodiments, the light source 1012 may be a light emitting diode (LED) or other types of suitable light sources. In the embodiment, the scanning element 1011 is adapted to receive the excitation beam L emitted from the light source 1012 and reflect the excitation beam L so that the excitation beam L scans in a plurality of scanning directions. In the embodiment, the scanning element 1011 is a scanning micro electro mechanical system mirror for example, but the invention is not limited thereto. In addition, the different scanning configurations of the excitation beam L to the wavelength conversion device 102 in the above embodiment will be described in detail later.

As shown in FIGS. 1 and 2, in the embodiment, the illumination beam IL1 provided by the illumination system 10 is modulated to the image beam IL2 having/containing image information by the light valve 12; that is, the illumination beam IL1 does not have/contain image information before being modulated by the light valve 12. Based on the same reason as described above, the excitation beam L provided by the scanning light source assembly 101 of the embodiment does not have/contain image information either.

As shown in FIG. 2, the first wavelength conversion material 1021, the second wavelength conversion material 1022, and the third wavelength conversion material 1023 of the wavelength conversion device 102 of the embodiment are, for example, sequentially arranged in the first direction D1 to form a one-dimensional array. In the embodiment, the excitation beam L emitted by the scanning light source assembly 101 is adapted to scan the wavelength conversion materials of the wavelength conversion device 102 in the first direction D1 and the second direction D2 by turns. Specifically, in the embodiment, the first direction D1 is parallel to the second direction D2, and the first direction D1 and the second direction D2 are opposite to each other. In the embodiment, the excitation beam L scans the wavelength conversion device 102 in the order of the first wavelength conversion material 1021, the second wavelength conversion material 1022, and the third wavelength conversion material 1023 in the first direction D1 (that is, sequentially scans the first wavelength conversion material 1021, the second wavelength conversion material 1022, and the third wavelength conversion material 1023), and then the excitation beam L scans the wavelength conversion device 102 in the order of the third wavelength conversion material 1023, the second wavelength conversion material 1022, and the first wavelength conversion material 1021 in the second direction D2 (that is, sequentially scans the third wavelength conversion material 1023, the second wavelength conversion material 1022, and the first wavelength conversion material 1021), and then the excitation beam L scans the wavelength conversion material of the wavelength conversion device 102 back and forth in the scanning order of the first direction D1 and the scanning order of the second direction D2 repeatedly to generate the color beams.

Figure 3A:
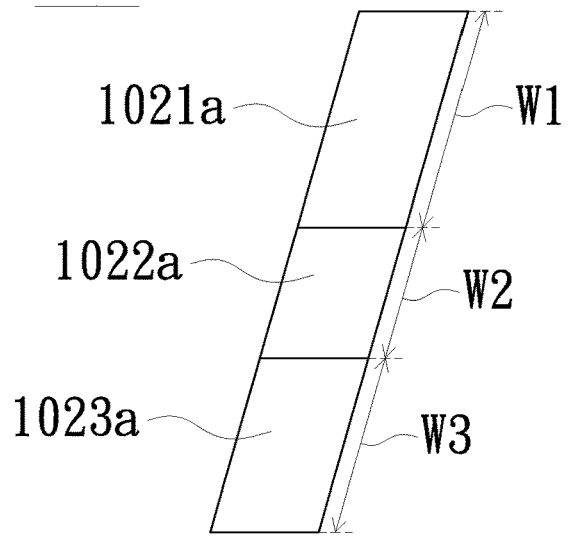
FIG. 3A is a schematic view of a wavelength conversion device in accordance with an embodiment of the invention.
Figure 3B:
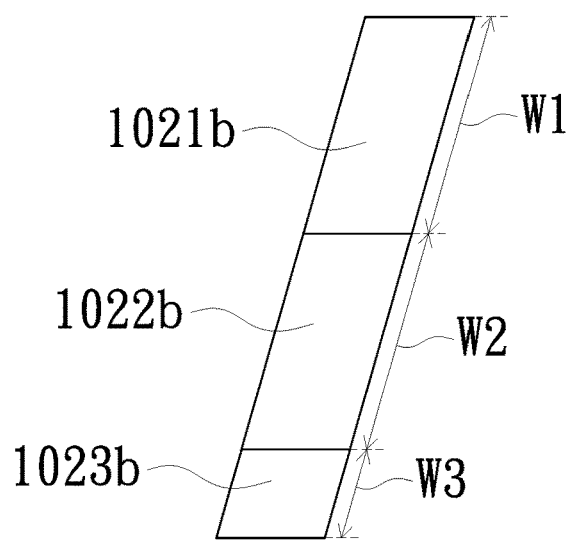
FIG. 3B is a schematic view of a wavelength conversion device in accordance with another embodiment of the invention.

As shown in FIG. 2, in the embodiment, the first wavelength conversion material 1021 has a first length W1, the second wavelength conversion material 1022 has a second length W2 and the third wavelength conversion material 1023 has a third length W3 in the first direction D1. The first length W1 of the first wavelength conversion material 1021, the second length W2 of the second wavelength conversion material 1022, and the third length W3 of the third wavelength conversion material 1023 are equal to each other for example, but the invention is not limited thereto. In the wavelength conversion device 102a of other embodiments as shown in FIG. 3A, the first length W1 of the first wavelength conversion material 1021a, the second length W2 of the second wavelength conversion material 1022a, and the third length W3 of the third wavelength conversion material 1023a are not equal to each other for example, but the invention is not limited thereto. In the wavelength conversion device 102b of still another embodiment as shown in FIG. 3B, the first length W1 of the first wavelength conversion material 1021b is equal to the second length W2 of the second wavelength conversion material 1022b, and the third length W3 of the third wavelength conversion material 1023b is not equal to the first length W1 and the second length W2, but the invention is not limited thereto. The length of the first length W1, the second length W2, and the third length W3 affects, for example, the lighting times of the color beams thereby causing that the color beams in the illumination beam have different luminance.

Figure 4:
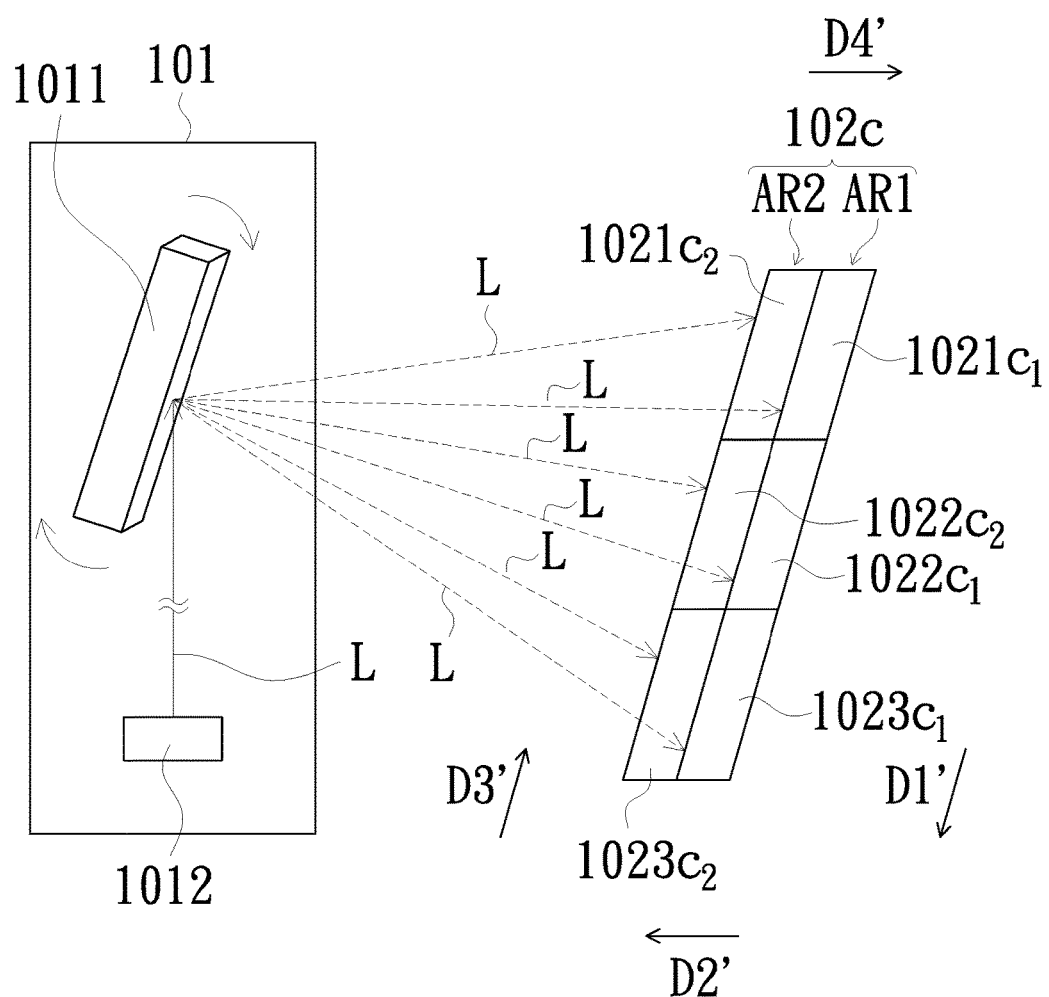
FIG. 4 is a schematic view of an illumination system in accordance with another embodiment of the invention.

FIG. 4 is a schematic view of an illumination system in accordance with another embodiment of the invention. As shown in FIG. 4, the illumination system 10a of the embodiment is similar to the illumination system 10 shown in FIG. 2, and the main difference is that a part of the wavelength conversion material (for example, the first wavelength conversion material $1021c_1$, the second wavelength conversion material $1022c_1$, and the third wavelength conversion material $1023c_1$) of the wavelength conversion device 102c of the illumination system 10a of the embodiment are sequentially arranged in the first direction D1' as the first row of wavelength conversion materials AR1, the other part of the wavelength conversion material (for example, the fourth wavelength conversion material $1021c_2$, the fifth wavelength conversion material $1022c_2$, and the sixth wavelength conversion material $1023c_2$) are sequentially arranged in the first direction D1' as the second row of wavelength conversion materials AR2, and the first row of wavelength conversion materials AR1 and the second row of wavelength conversion materials AR2 are parallel and do not overlap to each other. In the embodiment, the first row of wavelength conversion materials AR1 includes the first wavelength conversion material $1021c_1$, the second wavelength conversion material $1022c_1$, and the third wavelength conversion material $1023c_1$ sequentially arranged in the first direction D1', and the second row of wavelength conversion materials AR2 includes the fourth wavelength conversion material $1021c_2$, the fifth wavelength conversion material $1022c_2$, and the sixth wavelength conversion material $1023c_2$ sequentially arranged in the first direction D1'. In the embodiment, the first row of wavelength conversion materials AR1 is adjacent to the second row of wavelength conversion materials AR2. More specifically, the first wavelength conversion material $1021c_1$ and the fourth wavelength conversion material $1021c_2$ are adjacent to each other, the second wavelength conversion material $1022c_1$ and the fifth wavelength conversion material $1022c_2$ are adjacent to each other, and the third wavelength conversion material $1023c_1$ and the sixth wavelength conversion material $1023c_2$ are adjacent to each other, thereby forming a two-dimensional array. In the embodiment, the color of the first wavelength conversion material $1021c_1$ is the same as the color of the fourth wavelength conversion material $1021c_2$ for example, the color of the second wavelength conversion material $1022c_1$ is the same as the color of the fifth wavelength conversion material $1022c_2$ for example, and the color of the third wavelength conversion material $1023c_1$ is the same as the color of the sixth wavelength conversion material $1023c_2$ for example, but the invention is not limited thereto. In other embodiments, the colors of the first wavelength conversion material $1021c_1$, the second wavelength conversion material $1022c_1$, the third wavelength conversion material $1023c_1$, the fourth wavelength conversion material $1021c_2$, the fifth wavelength conversion material $1022c_2$, and the sixth wavelength conversion material $1023c_2$ are different, but the invention is not limited thereto. In short, the colors of the first wavelength conversion material $1021c_1$, the second wavelength conversion material $1022c_1$, the third wavelength conversion material $1023c_1$, the fourth wavelength conversion material $1021c_2$, the fifth wavelength conversion material $1022c_2$, and the sixth wavelength conversion material $1023c_2$ may be determined according to the design requirement, and the invention is not limited thereto.

As shown in FIG. 4, in the embodiment, the excitation beam L provided by the scanning light source assembly 101 is adapted to scan the wavelength conversion materials of the wavelength conversion device 102c in the first direction D1', the second direction D2', the third direction D3', and the fourth direction D4' in a rectangular scanning manner by turns, wherein the first direction D1' is not parallel to the second direction D2', the first direction D1' is not parallel to the fourth direction D4', the first direction D1' is parallel to the third direction D3', and the first direction D1' is opposite to the third direction D3'. Specifically, in the embodiment, the first direction D1' is perpendicular to the second direction D2' for example, the second direction D2' is parallel to the fourth direction D4' for example, and the second direction D2' is opposite to the fourth direction D4' for example. In the embodiment, the excitation beam L scans the first row of wavelength conversion materials AR1 in the order of the first wavelength conversion material $1021c_1$, the second wavelength conversion material $1022c_1$, and the third wavelength conversion material $1023c_1$ in the first direction D1', and then the scanning light source assembly 101 moves from the third wavelength conversion material $1023c_1$ of the first row of wavelength conversion materials AR1 to the sixth wavelength conversion material $1023c_2$ of the second row of wavelength conversion materials AR2 in the second direction D2', and then the excitation beam L scans the second row of wavelength conversion materials AR2 in the order of the sixth wavelength conversion material $1023c_2$, the fifth wavelength conversion material $1022c_2$, and the fourth wavelength conversion material $1021c_2$ in the third direction D3', and then the scanning light source assembly 101 moves from the fourth wavelength conversion material $1021c_2$ of the second row of wavelength conversion materials AR2 to the first wavelength conversion material $1021c_1$ of the first row of wavelength conversion materials AR1 in the fourth direction D4', and then the scanning light source assembly 101 scans the wavelength conversion material of the wavelength conversion device 102c continuously in the scanning order of the first direction D1', the second direction D2', the third direction D3', and the fourth direction D4' repeatedly.

In the embodiment, the excitation beam L sequentially scanning the first wavelength conversion material $1021c_1$, the second wavelength conversion material $1022c_1$, the third wavelength conversion material $1023c_1$, the sixth wavelength conversion material $1023c_2$, the fifth wavelength conversion material $1022c_2$, and the fourth wavelength conversion material $1021c_2$ in the first direction D1', the second direction D2', the third direction D3', and the fourth direction D4' in a rectangular scanning manner is one embodiment, and the invention is not limited thereto. In other embodiments, the excitation beam L scans the wavelengths conversion materials in the second direction D2', the first direction D1', the fourth direction D4', the first direction D1', and the second direction D2' in an S-shaped manner. Specifically, in the embodiment, the excitation beam L scans in the order of the first wavelength conversion material $1021c_1$ and the fourth wavelength conversion material $1021c_2$ in the second direction D2', and then the excitation beam L moves to the fifth wavelength conversion material $1022c_2$ and scans in the first direction D1', and then the excitation beam L moves to the second wavelength conversion material $1022c_1$ and scans in the fourth direction D4', and then the excitation beam L moves to the third wavelength conversion material $1023c_1$ and scans in the first direction D1', and then the excitation beam L moves to the sixth wavelength conversion material $1023c_2$ and scans in the second direction D2'. Then, the excitation beam L sequentially scans the first wavelength conversion material $1021c_1$, the fourth wavelength conversion material $1021c_2$, the fifth wavelength conversion material $1022c_2$, the second wavelength conversion material $1022c_1$, the third wavelength conversion material $1023c_1$, and the sixth wavelength conversion material $1023c_2$ in the scanning order of the second direction D2', the first direction D1', the fourth direction D4', the first direction D1', and the second direction D2' repeatedly to continuously scan the wavelength conversion materials of the wavelength conversion device 102c. However, the invention is not limited to the scanning order described above.

Figure 5:
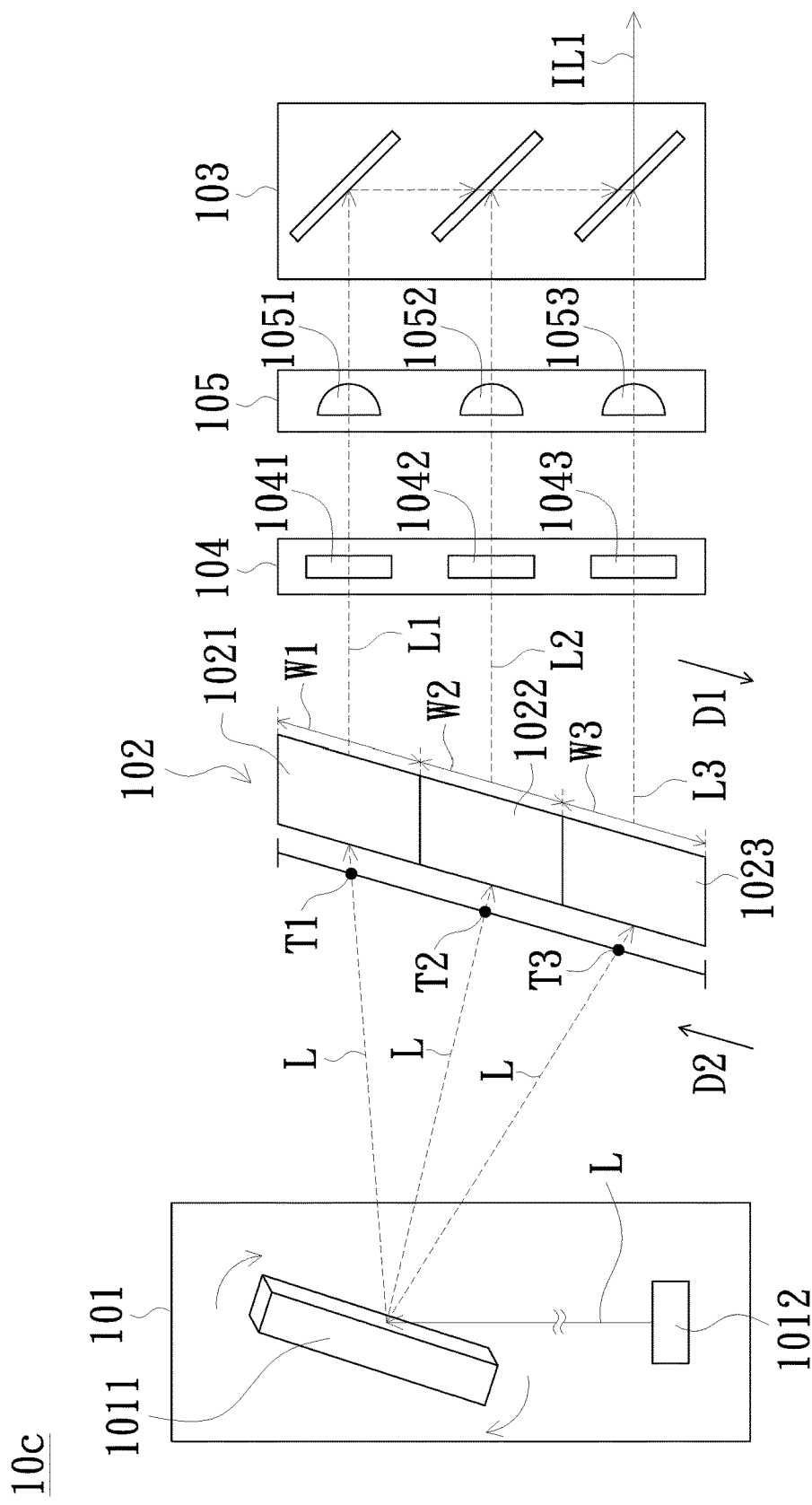
FIG. 5 is a schematic view of an illumination system in accordance with another embodiment of the invention.

FIG. 5 is a schematic view of an illumination system in accordance with another embodiment of the invention. As shown in FIG. 5, the illumination system 10c of the embodiment is similar to the illumination system 10 shown in FIG. 2, and the main difference is that the illumination system 10c of the embodiment further includes a light combining device 103, a light filter device 104, and a lens group 105. In the embodiment, the light combining device 103 is disposed on the transmission path of the first color beam L1, the second color beam L2, and the third color beam L3 from the lens group 105. The light combining device 103 is adapted to combine the first color beam L1, the second color beam L2, and the third color beam L3 into the illumination beam IL1. In the embodiment, the light filter device 104 is disposed on the transmission path of the first color beam L1, the second color beam L2 and the third color beam L3 from the wavelength conversion device 102 and is disposed/located between the wavelength conversion device 102 and the light combining device 103. The light filter device 104 is adapted to increase the color purity of the first color beam L1, the second color beam L2, and the third color beam L3. In the embodiment, the lens group 105 is disposed on the transmission path of the first color beam L1, the second color beam L2, and the third color beam L3 from the light filter device 104 and is disposed/located between the light combining device 103 and the light filter device 104. The lens group 105 is adapted to converge the first color beam L1, the second color beam L2, and the third color beam L3 to the light combining device 103. In the embodiment, the light combining device 103 has, for example, three light combining elements corresponding to the first wavelength conversion material 1021, the second wavelength conversion material 1022, and the third wavelength conversion material 1023 respectively. The three light combining elements include a mirror, a dichroic sheet or a dichroic mirror for guiding the first color beam L1, the second color beam L2, and the third color beam L3 to be combined into the illumination beam IL1. The light filter device 104 has, for example, a first filter element 1041, a second filter element 1042, and a third filter element 1043 corresponding to the first wavelength conversion material 1021, the second wavelength conversion material 1022, and the third wavelength conversion material 1023 respectively. The first filter element 1041, the second filter element 1042, and the third filter element 1043 may filter the color light having the unwanted wavelength range respectively, so that the color light passing through the first filter element 1041, the second filter element 1042, and the third filter element 1043 has a more pure color, that is, a color light having a desired wavelength range is obtained. The lens group 105 has, for example, a first lens 1051, a second lens 1052, and a third lens 1053 corresponding to the first wavelength conversion material 1021, the second wavelength conversion material 1022, and the third wavelength conversion material 1023, respectively. However, the invention is not limited to the above-described optical elements and optical layout design.

Figure 6:
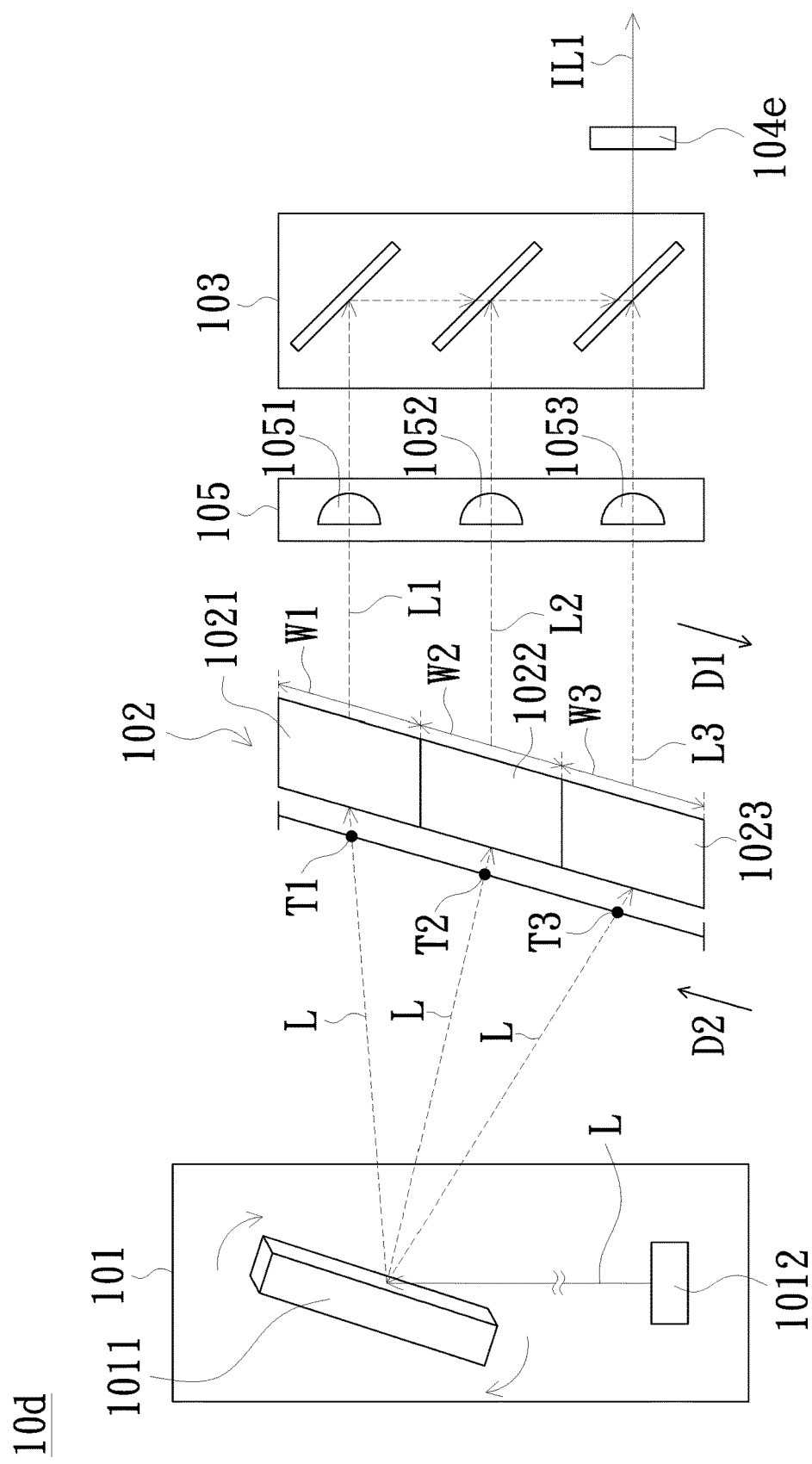
FIG. 6 is a schematic view of an illumination system in accordance with another embodiment of the invention.

FIG. 6 is a schematic view of an illumination system in accordance with another embodiment of the invention. As shown in FIG. 6, the illumination system 10d of the embodiment is similar to the illumination system 10 shown in FIG. 2, and the main difference is that the illumination system 10d of the embodiment further includes a light combining device 103, a light filter device 104e, and a lens group 105. In the embodiment, the light filter device 104e is disposed on the transmission path of the first color beam L1, the second color beam L2, and the third color beam L3 from the light combining device 103. In the embodiment, the light combining device 103 is disposed on the transmission path of the first color beam L1, the second color beam L2, and the third color beam L3 from the lens group 105 and is disposed/located between the wavelength conversion device 102 and the light filter device 104e and between the lens group 105 and the light filter device 104e. In the embodiment, the lens group 105 is disposed on the transmission path of the first color beam L1, the second color beam L2, and the third color beam L3 from the wavelength conversion device 102 and is disposed/located between the light combining device 103 and the wavelength conversion device 102. However, the invention is not limited to the above-described optical element and optical layout design. In the embodiment, the light combining device 103 has, for example, three light combining elements corresponding to the first wavelength conversion material 1021, the second wavelength conversion material 1022, and the third wavelength conversion material 1023 respectively, but the invention is not limited thereto. In the embodiment, the light filter device 104e is, for example, a color wheel having a plurality of filter zones, but the invention is not limited thereto. In the embodiment, the lens group 105 has, for example, a first lens 1051, a second lens 1052, and a third lens 1053 corresponding to the first wavelength conversion material 1021, the second wavelength conversion material 1022, and the third wavelength conversion material 1023 respectively, but the invention is not limited thereto.

Figure 7A:
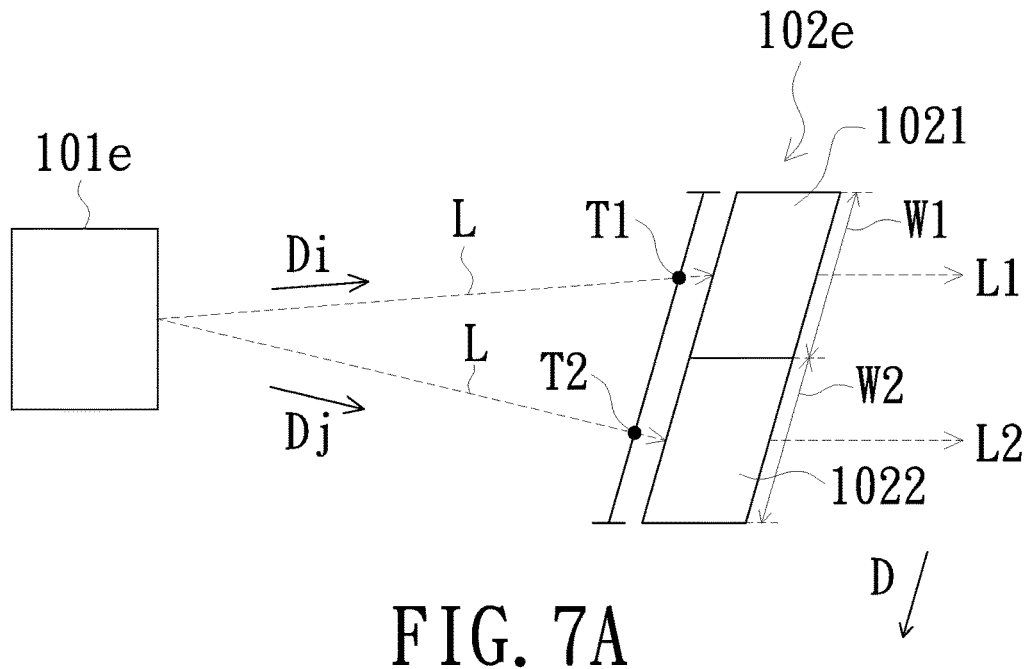
FIG. 7A is a schematic view of an illumination system in accordance with another embodiment of the invention.

FIG. 7A is a schematic view of an illumination system in accordance with another embodiment of the invention. Please refer to FIGS. 1 and 7A together. The illumination system 10e of the embodiment includes a scanning light source assembly 101e and a wavelength conversion device 102e. The scanning light source assembly 101e is adapted to provide the excitation beam L, and the excitation beam L is adapted to scan in a plurality of scanning directions. In the embodiment, the scanning light source assembly 101e may be implemented by a movable scanning element capable of changing the transmission path of the excitation beam L provided by the light source so that the excitation beam L may scan in a plurality of scanning directions, but the invention is not limited thereto. In other embodiments, the scanning light source assembly 101e may be implemented by a movable light source capable of providing the excitation beam L having a plurality of directions so that the excitation beam L may scan in a plurality of scanning directions, but the invention is not limited thereto. The wavelength conversion device 102e is disposed on the transmission path of the excitation beam L. In the embodiment, the wavelength conversion device 102e is fixed for example. In the embodiment, the excitation beam L is adapted to scan the wavelength conversion device 102e in a plurality of scanning directions in a plurality of time intervals respectively, wherein the excitation beam L in one of the time intervals is adapted to be converted into a color beam by the wavelength conversion device 102e, and the illumination beam IL1 includes the color beam. In the embodiment, the wavelength conversion device 102e includes a plurality of wavelength conversion materials. For example, in the embodiment, the wavelength conversion materials include a first wavelength conversion material 1021 and a second wavelength conversion material 1022. The first wavelength conversion material 1021 is disposed/located in a first region of the wavelength conversion device 102e for example, and the second wavelength conversion material 1022 is disposed/located in a second region of the wavelength conversion device 102e for example. In the embodiment, the excitation beam L is adapted to scan the first wavelength conversion material 1021 of the wavelength conversion device 102e in the scanning direction Di and scan the second wavelength conversion material 1022 of the wavelength conversion device 102e in the scanning direction Dj for example. In the embodiment, the excitation beam L provided from the scanning light source assembly 101e is adapted to sequentially scan the wavelength conversion materials (e.g., the first wavelength conversion material 1021 and the second wavelength conversion material 1022). The excitation beam L is converted into the first color beam L1 by the first wavelength conversion material 1021 disposed/located in the first region at the first time point T1 (or the first time interval) and into the second color beam L2 by the second wavelength conversion material 1022 disposed/located in the second region at the second time point T2 (or the second time interval). In the embodiment, the first color beam L1 and the second color beam L2 constitute the illumination beam IL1. In the embodiment, the first wavelength conversion material 1021 and the second wavelength conversion material 1022 are arranged in the direction D. The excitation beam L may sequentially scan the first wavelength conversion material 1021 and the second wavelength conversion material 1022 of the wavelength conversion device 102e in the direction D at the first time point T1 (or the first time interval) and the second time point T2 (or the second time interval) respectively, and then sequentially scan the first wavelength conversion material 1021 and the second wavelength conversion material 1022 of the wavelength conversion device 102e in the direction D at the third time point (or the third time interval) and the fourth time point (or the fourth time interval) respectively. In the embodiment, the excitation beam L does not have/contain image information, and the first color beam L1 and the second color beam L2 are modulated to an image beam IL2 having/containing image information by the light valve 12; that is, the excitation beam L, the first color beam L1, and the second color beam L2 before being incident on the light valve 12 do not have/contain image information due to without being processed by the imaging process. The second region of the wavelength conversion device 102e of the above embodiment has the second wavelength conversion material 1022 for example, but the invention is not limited thereto. The second region of the wavelength conversion device 102e of the other embodiments may be a wavelength reservation zone (not shown) without wavelength conversion material, i.e., the second region of the wavelength conversion device 102e may not have a wavelength conversion material in other embodiments. For example, in another embodiment not shown, the wavelength conversion device 102e may have only one wavelength conversion material (e.g., the first wavelength conversion material 1021 or the second wavelength conversion material 1022). In another embodiment, taking the wavelength conversion device 102e having the first wavelength conversion material 1021 but without the second wavelength conversion material 1022 as an example, the wavelength conversion device 102e may further include a wavelength reservation zone, and the wavelength reservation zone is disposed/located at the position of the second wavelength conversion material 1022 (i.e., the second region in the wavelength conversion device 102e) in FIG. 7A. In addition, the excitation beam L is converted into the first color beam L1 by the first wavelength conversion material 1021 disposed/located in the first region of the wavelength conversion device in 102e at the first time point T1 (or the first time interval) and is incident on the wavelength reservation zone disposed/located in the second region of the wavelength conversion device in 102e at the second time point T2 (or the second time interval), and the excitation beam L from the wavelength reservation zone and the first light beam L1 constitute the illumination beam IL1. In another embodiment, the wavelength reservation zone does not have a wavelength conversion material and thus does not convert the excitation beam L into a color beam of other colors. Instead, the wavelength reservation zone reflects the excitation beam L or allows the excitation beam L to pass therethrough, that is, the color of the excitation beam L reflected by or passing through the wavelength reservation zone is substantially the same as the color of the excitation beam L provided by the scanning light source assembly 101e. In another embodiment, the wavelength reservation zone that reflects the excitation beam L may be a reflective material. In another embodiment, the wavelength reservation zone that allows the excitation beam L to pass therethrough may be a light-penetrating material or an opening of the wavelength conversion device 102e. In other embodiments, the wavelength conversion device 102e includes at least one wavelength conversion material (e.g., the first wavelength conversion material 1021 and the second wavelength conversion material 1022) and a wavelength reservation zone (not shown). The excitation beam L sequentially is adapted to scan the wavelength conversion material (e.g., the first wavelength conversion material 1021 and the second wavelength conversion material 1022) and the wavelength reservation zone, and is converted into the first color beam L1 by the first wavelength conversion material 1021 at the first time point T1 (or the first time interval), converted into the second color beam L2 by the second wavelength conversion material 1022 at the second time point T2 (or the second time interval) and incident on the wavelength reservation zone at the third time point T3 (or the third time interval). In the above embodiment, the first time point T1, the second time point T2, the third time point and the fourth time point are different time points, and the first time interval, the second time interval, the third time interval and the four time intervals do not overlap with each other for example. In addition, in some embodiments, the wavelength conversion device 102e may be disposed with at least one filter element, that is, the wavelength conversion device 102e may be integrated with the light filter device as an optical device to achieve the effect of simplifying the design.

Figure 7B:
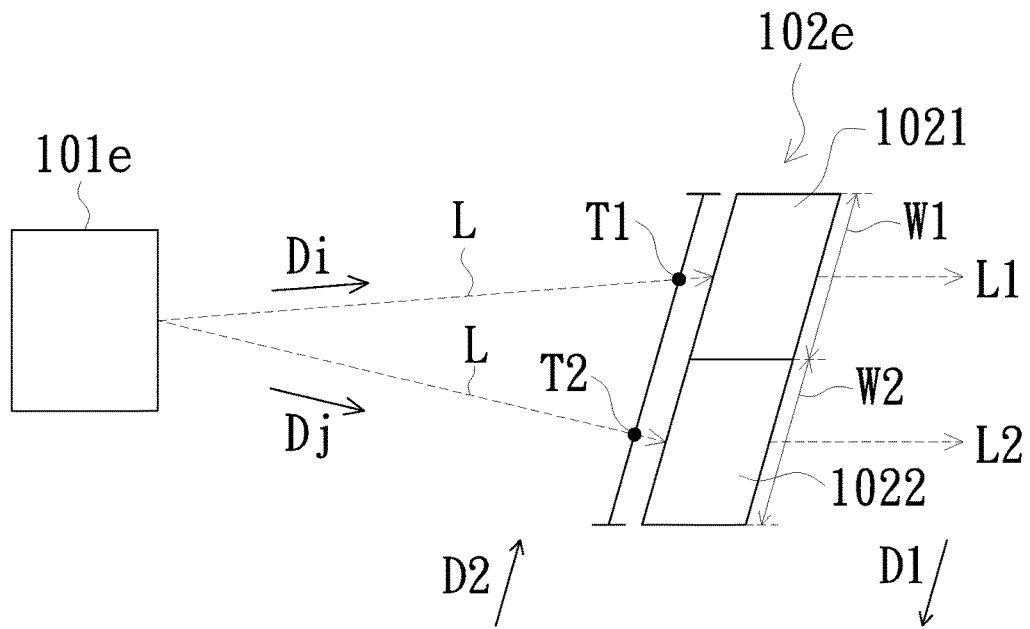
FIG. 7B is a schematic view of an illumination system in accordance with another embodiment of the invention.

FIG. 7B is a schematic view of an illumination system in accordance with another embodiment of the invention. As shown in FIG. 7B, the illumination system 10f of the embodiment is similar to the illumination system 10e shown in FIG. 7A, and the main difference is that the excitation beam L first sequentially scans the first wavelength conversion material 1021 and the second wavelength conversion material 1022 in the first direction D1 at the first time point T1 (or the first time interval) and the second time point T2 (or the second time interval) respectively, and then sequentially scans the second wavelength conversion material 1022 and the first wavelength conversion material 1021 in the second direction D2 at the third time point (or the third time interval) and the fourth time point (or the fourth time interval) respectively, and then scans the wavelength conversion materials of the wavelength conversion device 102 back and forth in the scanning order in the first direction D1 and the scanning order in the second direction D2 repeatedly.

FIG. 8A is a scanning order diagram of a scanning light source assembly in accordance with an embodiment of the invention. As shown in FIG. 8A, in the embodiment, the wavelength conversion device 102g includes a first row of wavelength conversion materials AR1, a second row of wavelength conversion materials AR2, a third row of wavelength conversion materials AR3, a fourth row of wavelength conversion materials AR4, and a fifth row of wavelength conversion materials AR5; wherein the first row of wavelength conversion materials AR1, the second row of wavelength conversion materials AR2, the third row of wavelength conversion materials AR3, the fourth row of wavelength conversion materials AR4, and the fifth row of wavelength conversion materials AR5 are parallel and do not overlap with each other. In the embodiment, the scanning light source assembly may scan the wavelength conversion device 102g in the directions Da, Db, Dc and Dd for example; wherein the direction Da is parallel to the direction Dc, the direction Da is opposite to the direction Dc, the direction Da is not parallel to the direction Db, and the direction Da is not parallel to the direction Dd. In the embodiment, the direction Da is perpendicular to the direction Db for example, and the direction Db is parallel to the direction Dd for example. In the embodiment, the scanning light source assembly first scans the first row of wavelength conversion materials AR1 in the direction Da, and then moves from the first row of wavelength conversion materials AR1 to the second row of wavelength conversion materials AR2 in the direction Db, and then scans the second row of wavelength conversion materials AR2 in the direction Dc, and then moves from the second row of wavelength conversion materials AR2 to the third row of wavelength conversion materials AR3 in the direction Db, and then scans the third row of wavelength conversion materials AR3 in the direction Da, and then moves from the third row of wavelength conversion materials AR3 to the fourth row of wavelength conversion materials AR4 in the direction Db, and then scans the fourth row of wavelength conversion materials AR4 in the direction Dc, and then moves from the fourth row of wavelength conversion materials AR4 to the fifth row of wavelength conversion materials AR5 in the direction Db, and then scans the fifth row of wavelength conversion materials AR5 in the direction Da, and then returns from the fifth row of wavelength conversion materials AR5 to the fourth row of wavelength conversion materials AR4 in the direction Dd, and then scans the fourth row of wavelength conversion materials AR4 in the direction Dc, and then returns from the fourth row wavelength material AR4 to the third row of wavelength conversion materials AR3 in the direction Dd, and then scans the third row of wavelength conversion materials AR3 in the direction Da, and then returns from the third row of wavelength conversion materials AR3 to the second row of wavelength conversion materials AR2 in the direction Dd, and then scans the second row of wavelength conversion materials AR2 in the direction Dc, and then returns from the second row of wavelength conversion materials AR2 to the first row of wavelength conversion materials AR1 in the direction Dd. Then, the scanning light source assembly continuously scans the wavelength conversion device 102g in the above-described scanning order of the directions Da, Db, Dc, Db, Db, Dc, Dc, Db, Da, Dd, Dc, Dd, Da, Dd, Dc and Dd repeatedly. However, the invention is not limited to the scanning order described above.

FIG. 8B is a scanning order diagram of a scanning light source assembly in accordance with another embodiment of the invention. As shown in FIG. 8B, the scanning order of the scanning light source assembly of the embodiment is similar to the scanning order of the scanning light source assembly shown in FIG. 8A, and the main difference is that the scanning light source assembly of the embodiment may scan the wavelength conversion device 102g in the directions Da, Db, Dc and De for example; wherein the direction Da is parallel to the direction Dc, the direction Da is opposite to the direction Dc, the direction Da is not parallel to the direction Db, and the direction Da is not parallel to the direction De. In the embodiment, the direction Da is perpendicular to the direction Db for example, and the direction Db is not parallel to the direction De. In the embodiment, after completing the scanning of the fifth row of wavelength conversion materials AR5, the scanning light source assembly returns from the fifth row of wavelength conversion materials AR5 to the first row of wavelength conversion materials AR1 in the direction De, and then sequentially scans the first row of wavelength conversion materials AR1, the second row of wavelength conversion materials AR2, the third row of wavelength conversion materials AR3, the fourth row of wavelength conversion materials AR4, and the fifth row of wavelength conversion materials AR5. However, the invention is not limited to the scanning order described above.

Figure 8C:
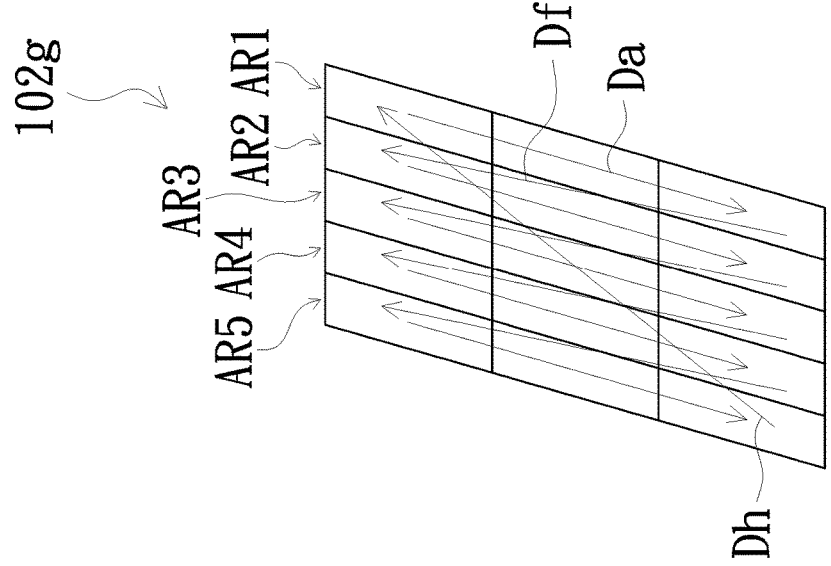
FIG. 8C is a scanning order diagram of a scanning light source assembly in accordance with another embodiment of the invention.

FIG. 8C is a scanning order diagram of a scanning light source assembly in accordance with another embodiment of the invention. As shown in FIG. 8C, the scanning order of the scanning light source assembly of the embodiment is similar to the scanning order of the scanning light source assembly shown in FIG. 8A, and the main difference is that the scanning light source assembly of the embodiment may scan the wavelength conversion device 102g in the directions Da, Df and Dg for example; wherein the direction Da is not parallel to the direction Df, the direction Da is substantially opposite to the direction Df, and the direction Da is substantially opposite to the direction Dg. In the embodiment, the direction Da is not parallel to the direction Dg for example. In the embodiment, the scanning light source assembly first scans the first row of wavelength conversion materials AR1 in the direction Da, and then moves from the first row of wavelength conversion materials AR1 to the second row of wavelength conversion materials AR2 in the direction Df, and then scans the second row of wavelength conversion materials AR2 in the direction Da, and then moves from the second row of wavelength conversion materials AR2 to the third row of wavelength conversion materials AR3 in the direction Df, and then scans the third row of wavelength conversion materials AR3 in the direction Da, and then moves from the third row of wavelength conversion materials AR3 to the fourth row of wavelength conversion materials AR4 in the direction Df, and then scans the fourth row of wavelength conversion materials AR4 in the direction Da, and then moves from the fourth row of wavelength conversion materials AR4 to the fifth row of wavelength conversion materials AR5 in the direction Df, and then scans the fifth row of wavelength conversion materials AR5 in the direction Da, and then returns from the fifth row of wavelength conversion materials AR5 to the fourth row of wavelength conversion materials AR4 in the direction Dg, and then scans the fourth row of wavelength conversion materials AR4 in the direction Da, and then returns from the fourth row wavelength material AR4 to the third row of wavelength conversion materials AR3 in the direction Dg, and then scans the third row of wavelength conversion materials AR3 in the direction Da, and then returns from the third row of wavelength conversion materials AR3 to the second row of wavelength conversion materials AR2 in the direction Dg, and then scans the second row of wavelength conversion materials AR2 in the direction Da, and then returns from the second row of wavelength conversion materials AR2 to the first row of wavelength conversion materials AR1 in the direction Dg. Then, the scanning light source assembly continuously scans the wavelength conversion device 102g in the above-described scanning order of the directions Da, Df, Da, Df, Da, Df, Da, Dg, Da, Dg, Da, Dg, Da and Dg repeatedly. However, in order to facilitate the description of the scanning order in FIG. 8C, only one direction Dg is shown in FIG. 8C. In addition, the invention is not limited to the scanning order described above.

Figure 8D:
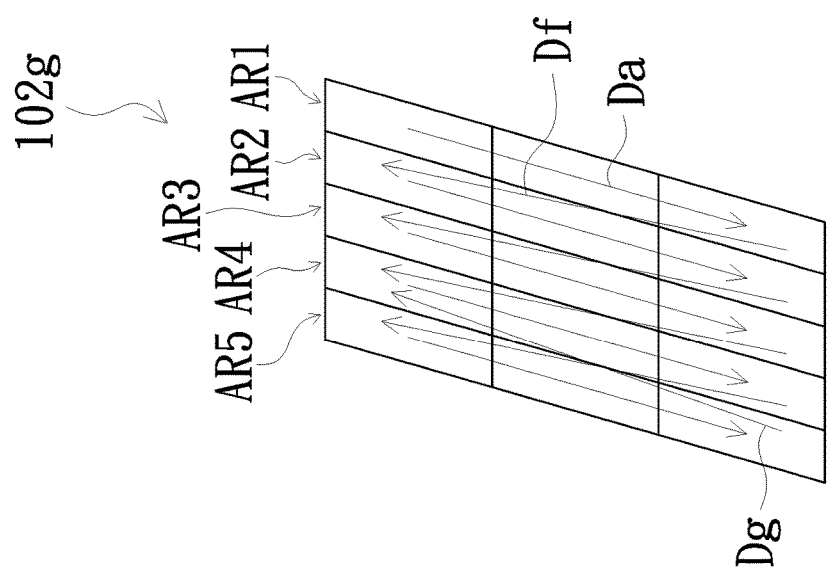
FIG. 8D is a scanning order diagram of a scanning light source assembly in accordance with another embodiment of the invention.

FIG. 8D is a scanning order diagram of a scanning light source assembly in accordance with another embodiment of the invention. As shown in FIG. 8D, the scanning order of the scanning light source assembly of the embodiment is similar to the scanning order of the scanning light source assembly shown in FIG. 8C, and the main difference is that the scanning light source assembly of the embodiment may scan the wavelength conversion device 102g in the directions Da, Df and Dh for example; wherein the direction Da is not parallel to the direction Df, and the direction Da is substantially opposite to the direction Df. In the embodiment, after completing the scanning of the fifth row of wavelength conversion materials AR5, the scanning light source assembly returns from the fifth row of wavelength conversion materials AR5 to the first row of wavelength conversion materials AR1 in the direction Dh, and then sequentially scans the first row of wavelength conversion materials AR1, the second row of wavelength conversion materials AR2, the third row of wavelength conversion materials AR3, the fourth row of wavelength conversion materials AR4, and the fifth row of wavelength conversion materials AR5. However, the invention is not limited to the scanning order described above.

In summary, the illumination system of the projector of the embodiment of the invention includes a scanning light source assembly and a wavelength conversion device. In the embodiment of the invention, the wavelength conversion device is disposed on the transmission path of the excitation beam emitted from the scanning light source assembly. In the embodiment of the invention, the excitation beam is adapted to scan the wavelength conversion device in a plurality of scanning directions in a plurality of time intervals respectively, and the excitation beam is converted into a color beam by the wavelength conversion device in one of the time intervals. In the embodiment of the invention, the excitation beam of the scanning light source assembly is adapted to sequentially scan a plurality of wavelength conversion materials of the wavelength conversion device, thereby causing the wavelength conversion device to generate different color beams. In the structural design of the illumination system of the embodiment of the invention, the structure of the fixed wavelength conversion device and the movable light source/scanning element in the scanning light source module is simple, so that the wavelength conversion materials may have a variety of various arrangements and also have a good wavelength conversion efficiency, ultra-low noise or no noise and other advantages. Thus, the 1 illumination system of the embodiment of the invention is disposed at the projector without increasing the volume of the projector, thereby causing the projector has an advantage of being short and thin.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
    an illumination system, comprising:
        a scanning light source assembly, adapted to provide an excitation beam, wherein the excitation beam is adapted to scan in a plurality of scanning directions; and
        a wavelength conversion device, disposed on a transmission path of the excitation beam, wherein the excitation beam scans the wavelength conversion device in the scanning directions in a plurality of time intervals respectively, and the excitation beam is converted into a color beam by the wavelength conversion device in one of the time intervals;
    a light valve, disposed on a transmission path of an illumination beam, and adapted to convert the illumination beam into an image beam, wherein the illumination beam comprises the color beam;
    a lens, disposed on a transmission path of the image beam,
    a light combining device, disposed on a transmission path of the color beam;
    a light filter device, disposed on the transmission path of the color beam; and
    a lens group, disposed between the wavelength conversion device and the light combining device.

2. The projector according to claim 1, wherein the time intervals have a first time interval and a second time interval, the first time interval does not overlap with the second time interval, the excitation beam is converted into the color beam by a first region of the wavelength conversion device in the first time interval, the excitation beam is incident on a second region of the wavelength conversion device in the second time interval, the first region has a first wavelength conversion material, and the second region has a second wavelength conversion material or is a wavelength reservation zone without wavelength conversion material.

3. The projector according to claim 1, wherein the wavelength conversion device comprises a plurality of wavelength conversion materials, the wavelength conversion materials comprise a first wavelength conversion material, a second wavelength conversion material, and a third wavelength conversion material, wherein the excitation beam is adapted to sequentially scan the wavelength conversion materials so as to be converted into a first color beam by the first wavelength conversion material at a first time point, converted into a second color beam by the second wavelength conversion material at a second time point and converted into a third color beam by the third wavelength conversion material at a third time point, wherein the color beam is the first color beam, the second color beam or the third color beam, wherein the first color beam, the second color beam, and the third color beam constitute the illumination beam.

4. The projector according to claim 3, wherein the wavelength conversion materials are sequentially arranged in a first direction, the excitation beam is adapted to scan the wavelength conversion device in the first direction and a second direction by turns, wherein the excitation beam is adapted to sequentially scan the wavelength conversion materials in the first direction, the excitation beam is adapted to sequentially scan the wavelength conversion materials in the second direction, the first direction is parallel to the second direction, and the first direction is opposite to the second direction.

5. The projector according to claim 3, wherein a part of the wavelength conversion materials are sequentially arranged in a first direction as a first row of wavelength conversion materials, another part of the wavelength conversion materials are sequentially arranged in the first direction as a second row of wavelength conversion materials, the first row of wavelength conversion materials and the second row of wavelength conversion materials are parallel to each other and do not overlap with each other, the scanning light source assembly is adapted to scan the wavelength conversion device in the first direction, a second direction, a third direction, and a fourth direction by turns, wherein the excitation beam is adapted to sequentially scan the first row of wavelength conversion materials in the first direction, the scanning light source assembly is adapted to move from the first row of wavelength conversion materials to the second row of wavelength conversion materials in the second direction, the excitation beam is adapted to sequentially scan the second row of wavelength conversion materials in the third direction, the scanning light source assembly is adapted to move from the second row of wavelength conversion materials to the first row of wavelength conversion materials in the fourth direction, the first direction is not parallel to the second direction, the first direction is parallel to the third direction, and the first direction is opposite to the third direction.

6. The projector according to claim 4, wherein the first wavelength conversion material extends in the first direction to have a first length, the second wavelength conversion material extends in the first direction to have a second length, the third wavelength conversion material extends in the first direction to have a third length, wherein the first length, the second length, and the third length are equal to or not equal to each other.

7. The projector according to claim 1, wherein the scanning light source assembly comprises:
    a light source, adapted to emit the excitation beam; and
    a scanning element, adapted to receive the excitation beam emitted from the light source, and adapted to reflect the excitation beam so that the excitation beam is adapted to scan in the scanning directions.

8. The projector according to claim 7, wherein the scanning element is a scanning micro electro mechanical system mirror.

9. The projector according to claim 1, wherein the light filter device is disposed between the wavelength conversion device and the light combining device.

10. The projector according to claim 1, wherein the light combining device is disposed between the wavelength conversion device and the light filter device.

11. The projector according to claim 1, wherein the excitation beam provided by the scanning light source assembly does not have image information.

12. The projector according to claim 1, wherein the wavelength conversion device comprises at least one wavelength conversion material and a wavelength reservation zone, the excitation beam is adapted to sequentially scan the wavelength conversion material and the wavelength reservation zone so as to be converted into the color beam by the wavelength conversion material at a first time point and incident on the wavelength reservation zone at a second time point.

13. An illumination system, comprising:
   a scanning light source assembly, adapted to provide an excitation beam, wherein the excitation beam is adapted to scan in a plurality of scanning directions, and the excitation beam does not have image information; and
   a wavelength conversion device, disposed on a transmission path of the excitation beam, wherein the excitation beam scans the wavelength conversion device in the scanning directions in a plurality of time intervals respectively, and the excitation beam is converted into a color beam by the wavelength conversion device in one of the time intervals,
   a light combining device, disposed on a transmission path of the color beam;
   a light filter device, disposed on the transmission path of the color beam; and
   a lens group, disposed between the wavelength conversion device and the light combining device.

14. The illumination system according to claim 13, wherein the time intervals have a first time interval and a second time interval, the first time interval does not overlap with the second time interval, the excitation beam is converted into the color beam by a first region of the wavelength conversion device in the first time interval, the excitation beam is incident on a second region of the wavelength conversion device in the second time interval, the first region has a first wavelength conversion material, and the second region has a second wavelength conversion material or is a wavelength reservation zone without wavelength conversion material.

15. The illumination system according to claim 13, wherein the wavelength conversion device comprises a plurality of wavelength conversion materials, the wavelength conversion materials comprise a first wavelength conversion material, a second wavelength conversion material, and a third wavelength conversion material, wherein the excitation beam is adapted to sequentially scan the wavelength conversion materials so as to be converted into a first color beam by the first wavelength conversion material at a first time point, converted into a second color beam by the second wavelength conversion material at a second time point and converted into a third color beam by the third wavelength conversion material at a third time point, wherein the color beam is the first color beam, the second color beam or the third color beam.

16. The illumination system according to claim 15, wherein the wavelength conversion materials are sequentially arranged in a first direction, the excitation beam is adapted to scan the wavelength conversion device in the first direction and a second direction by turns, wherein the excitation beam is adapted to sequentially scan the wavelength conversion materials in the first direction, the excitation beam is adapted to sequentially scan the wavelength conversion materials in the second direction, the first direction is parallel to the second direction, and the first direction is opposite to the second direction.

17. The illumination system according to claim 15, wherein a part of the wavelength conversion materials are sequentially arranged in a first direction as a first row of wavelength conversion materials, another part of the wavelength conversion materials are sequentially arranged in the first direction as a second row of wavelength conversion materials, the first row of wavelength conversion materials and the second row of wavelength conversion materials are parallel to each other and do not overlap with each other, the scanning light source assembly is adapted to scan the wavelength conversion device in the first direction, a second direction, a third direction, and a fourth direction by turns, wherein the excitation beam is adapted to sequentially scan the first row of wavelength conversion materials in the first direction, the scanning light source assembly is adapted to move from the first row of wavelength conversion materials to the second row of wavelength conversion materials in the second direction, the excitation beam is adapted to sequentially scan the second row of wavelength conversion materials in the third direction, the scanning light source assembly is adapted to move from the second row of wavelength conversion materials to the first row of wavelength conversion materials in the fourth direction, the first direction is not parallel to the second direction, the first direction is parallel to the third direction, and the first direction is opposite to the third direction.

18. The illumination system according to claim 16, wherein the first wavelength conversion material extends in the first direction to have a first length, the second wavelength conversion material extends in the first direction to have a second length, the third wavelength conversion material extends in the first direction to have a third length, wherein the first length, the second length, and the third length are equal to or not equal to each other.

19. The illumination system according to claim 13, wherein the scanning light source assembly comprises:
   a light source, adapted to emit the excitation beam; and
   a scanning element, adapted to receive the excitation beam emitted from the light source, and adapted to reflect the excitation beam so that the excitation beam is adapted to scan in the scanning directions.

20. The illumination system according to claim 19, wherein the scanning element is a scanning micro electro mechanical system mirror.

21. The illumination system according to claim 13, wherein the light filter device is disposed between the wavelength conversion device and the light combining device.

22. The illumination system according to claim 13, wherein the light combining device is disposed between the wavelength conversion device and the light filter device.

23. The illumination system according to claim 13, wherein the wavelength conversion device comprises at least one wavelength conversion material and a wavelength reservation zone, the excitation beam is adapted to sequentially scan the wavelength conversion material and the wavelength reservation zone so as to be converted into the color beam by the wavelength conversion material at a first time point and incident on the wavelength reservation zone at a second time point.

* * * * *